(12) United States Patent
Gül et al.

(10) Patent No.: US 12,483,612 B2
(45) Date of Patent: Nov. 25, 2025

(54) IMMERSIVE VIEWPORT DEPENDENT MULTIPARTY VIDEO COMMUNICATION

(71) Applicant: Fraunhofer-Gesellschaft zur Förderung der angewandten Forschung e.V., Munich (DE)

(72) Inventors: Serhan Gül, Berlin (DE); Yago Sánchez De La Fuente, Berlin (DE); Cornelius Hellge, Berlin (DE); Thomas Schierl, Berlin (DE); Robert Skupin, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 88 days.

(21) Appl. No.: 17/720,477

(22) Filed: Apr. 14, 2022

(65) Prior Publication Data

US 2022/0239719 A1     Jul. 28, 2022

Related U.S. Application Data

(63) Continuation of application No. PCT/EP2020/078277, filed on Oct. 8, 2020.

(30) Foreign Application Priority Data

Oct. 14, 2019   (EP) .................................... 19203077

(51) Int. Cl.
*H04L 65/65*     (2022.01)
*H04L 65/1069*   (2022.01)
(Continued)

(52) U.S. Cl.
CPC .......... *H04L 65/65* (2022.05); *H04L 65/1069* (2013.01); *H04L 65/403* (2013.01); *H04L 65/80* (2013.01); *H04N 21/21805* (2013.01)

(58) Field of Classification Search
CPC ... H04L 65/1069; H04L 65/403; H04L 65/80; H04L 65/65; H04N 21/21805
See application file for complete search history.

(56) References Cited

U.S. PATENT DOCUMENTS 10,523,914 B1 * 12/2019 Phillips ............ H04N 21/21805
10,595,069 B2 *  3/2020 Swaminathan .... H04N 21/2662
(Continued)

FOREIGN PATENT DOCUMENTS

KR   10-2018-0081128 A   7/2018
KR   10-2019-0040746 A   4/2019
(Continued)

OTHER PUBLICATIONS

International Search Report and Written Opinion dated Dec. 21, 2020, issued in application No. PCT/EP2020/078277.
(Continued)

*Primary Examiner* — Kristie D Shingles
(74) *Attorney, Agent, or Firm* — McClure, Qualey & Rodack, LLP

(57) ABSTRACT

An apparatus for providing immersive media content to a plurality of receivers is described. The apparatus obtains for a representation of the immersive media content a plurality of tiles, the plurality of tiles covering some or all of the representation, and, for some or all of the plurality receivers, transmits to each receiver one or more of the tiles, the one or more tiles covering at least a viewport associated with the respective receiver.

15 Claims, 8 Drawing Sheets

(51) Int. Cl.
*H04L 65/403* (2022.01)
*H04L 65/80* (2022.01)
*H04N 21/218* (2011.01)

(56) References Cited

U.S. PATENT DOCUMENTS

| | | |
|---|---|---|
| 2017/0294049 A1 | 10/2017 | Zhou |
| 2017/0324945 A1 | 11/2017 | Cole |
| 2018/0160160 A1 | 6/2018 | Swaminathan |
| 2018/0324355 A1 | 11/2018 | Wang |
| 2018/0367586 A1 | 12/2018 | Maze |
| 2019/0253734 A1 | 8/2019 | Lee et al. |
| 2020/0107003 A1* | 4/2020 | Phillips ............... H04N 19/152 |
| 2020/0177939 A1* | 6/2020 | Swaminathan .... H04N 21/2662 |
| 2021/0006614 A1* | 1/2021 | Oyman ................. H04N 19/30 |
| 2021/0092347 A1* | 3/2021 | Han ..................... H04N 13/282 |
| 2021/0120066 A1* | 4/2021 | Oyman .................. H04L 67/14 |

FOREIGN PATENT DOCUMENTS

| | | |
|---|---|---|
| KR | 10-2019-0075051 A | 6/2019 |
| WO | 2019/038433 A1 | 2/2019 |

OTHER PUBLICATIONS

Schulzrinne, H., et al.; "RFC 3550—RTP: A Transport Protocol for Real-Time Applications;" Network Working Group; Jul. 2003; pp. 1-89.
Wang, Y.K., et al.; "RFC 7798—RTP Payload Format for High Efficiency Video Coding (HEVC);" Internet Engineering Task Force (IETF); Mar. 2016; pp. 1-86.
Singer, D., et al.; "RFC 8285—A General Mechanism for RTP Header Extensions;" Internet Engineering Task Force (IETF); Oct. 2017; pp. 1-25.
Ott, J., et al.; "RFC 4585—Extended RTP Profile for Real-time Transport Control Protocol (RTCP)-Based Feedback (RTP/AVPF);" Network Working Group; Jul. 2006; pp. 1-51.
Friedman, T., et al.; "RFC 3611—RTCP extended reports (XRs);" Network Working Group; Nov. 2003; pp. 1-55.
Ott, J., et al.; "RFC 5968—Guidelines Multiple RTP Streams in a Single RTP Session;" Internet Engineering Task Force (IETF); Sep. 2010; pp. 1-15.
Lennox, J., et al.; "RFC 8108—Sending Multiple RTP Streams in a Single RTP Session;" Internet Engineering Task Force (IETF); Mar. 2017; pp. 1-29.
Westerlund, M., et al.; "RFC 7667—RTP Topologies;" Internet Engineering Task Force (IETF); Nov. 2015; pp. 1-48.
3GPP TS 26.114; "IP Multimedia Subsystem (IMS); Multimedia telephony; Media handling and interaction;" Mar. 2022; pp. 1-480.
3GPP TS 26.223; Telepresence using the IP Multimedia Subsystem (IMS); Media handling and interaction; Apr. 2022; pp. 1-41.
OMAF—ISO/IEC 23090-2:2019; "Information technology—Coded representation of immersive media—Part 2: Omnidirectional media format;" Dec. 2017; pp. 1-181.
Intel; "ITT4RT: Example Signaling Flows and Media Processing Procedures;" 3GPP Draft; 54-190608 ITT4RT Signaling Flows, 3rd Generation-Partnership Project (3GPP); Jul. 2019; pp. 1-4.
Lennox, J., et al.; RTP (RFC 5576, J. Lennox et al. "Source-Specific SDP Attributes in the Session Description Protocol (SDP);" Network Working Group; Jun. 2009; pp. 1-18.
Huawei Technologies Co., Ltd., et al.; "New Work Item on Support of Immersive Teleconferencing and Telepresence for Remote Terminals;" 3GPP TSG SA Meeting #82; Dec. 2018; pp. 1-3.
Korean language office action dated Jul. 17, 2023, issued in application No. KR 10-2022-7016346.
English language translation of office action dated Jul. 17, 2023.
Office Action dated Jun. 6, 2024, issued in application No. EP 20785534.7.
Intel et al.; "TT4RT Permanent Document Requirements, Working Assumptions and Potential Solutions;" 3GPP Draft; S4-190888_ITT4RT_Permanent_Document V0.3.0, 3GPP, vol. SA WG4; Aug. 2019; pp. 1-16.
Intel; "ITT4RT: Example Signaling Flows and Media Processing Procedures;" 3GPP Draft; S4-190608_ITT4RT Signaling Flows, 3GPP, vol. SA WG4; Jun. 2019; pp. 1-4.
He, L. et al.; "View-Dependent Streaming of Dynamic Point Cloud over Hybrid Networks;" Advances in Multimedia Information Processing; 2018; pp. 50-58.

* cited by examiner

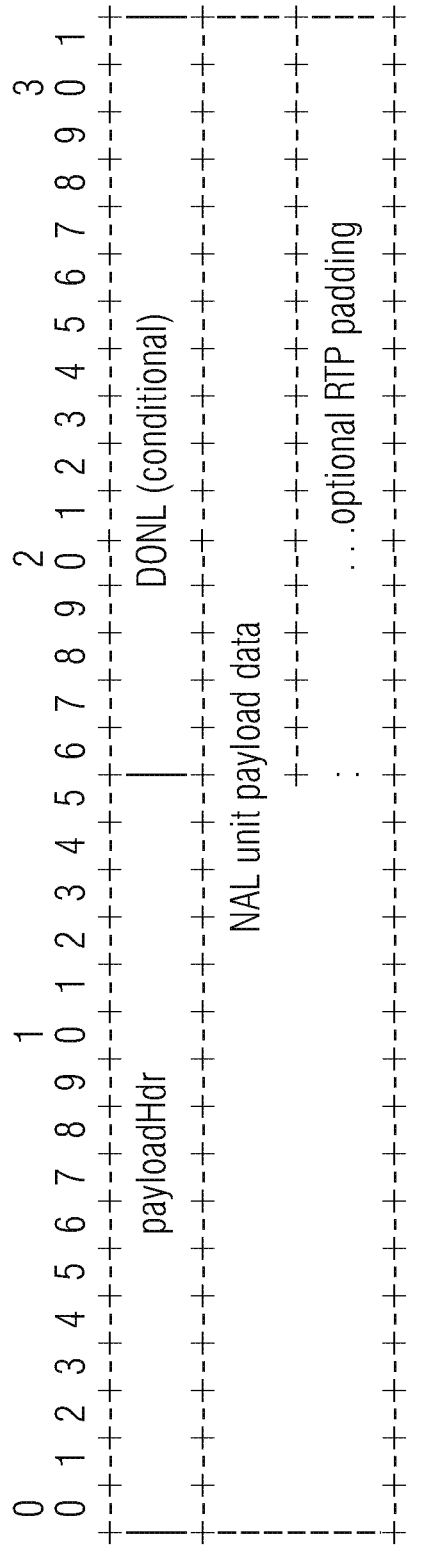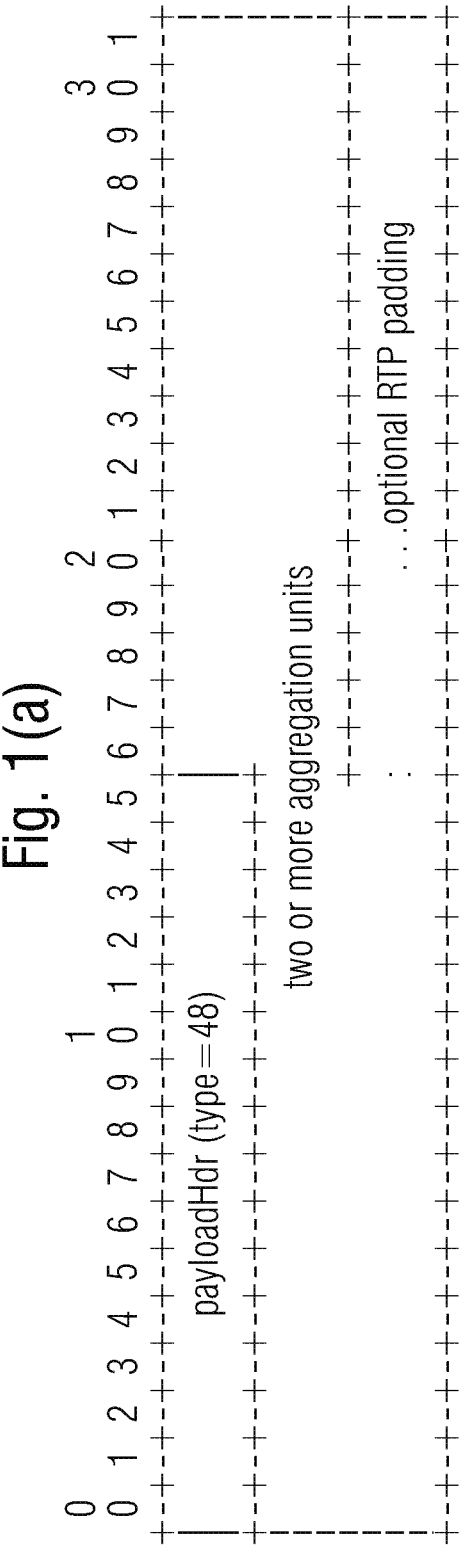

structure of an FU structure of a PACI

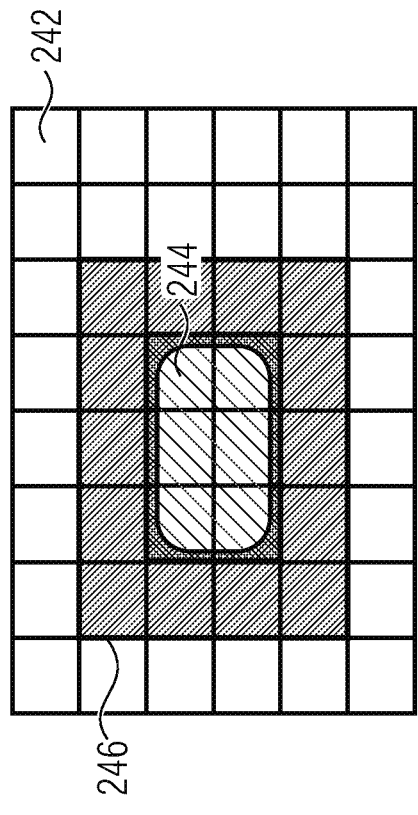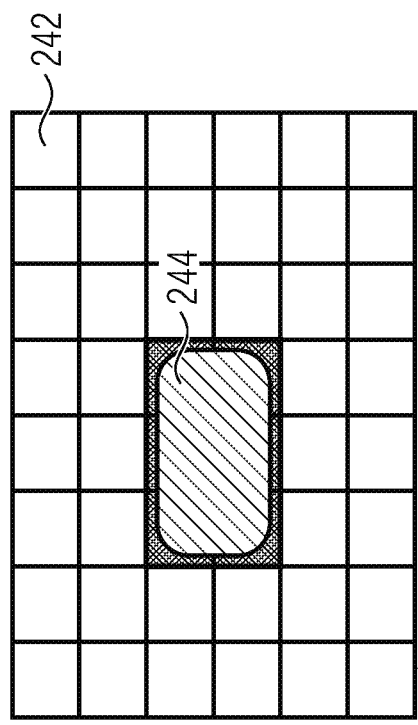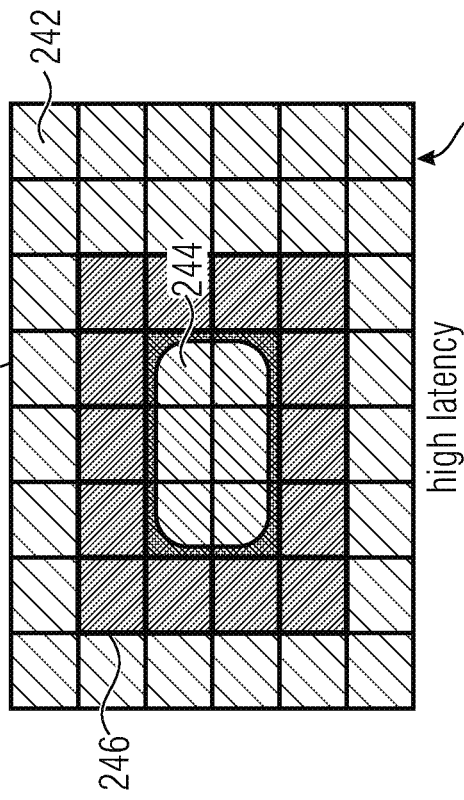
Fig. 5(a) low latency
Fig. 5(b) medium latency
Fig. 5(c) high latency

IMMERSIVE VIEWPORT DEPENDENT MULTIPARTY VIDEO COMMUNICATION

CROSS-REFERENCES TO RELATED APPLICATIONS

This application is a continuation of copending International Application No. PCT/EP2020/078277, filed Oct. 8, 2020, which is incorporated herein by reference in its entirety, and additionally claims priority from European Application No. EP 19 203 077.3, filed Oct. 14, 2019, which is incorporated herein by reference in its entirety.

BACKGROUND OF THE INVENTION

The present invention relates to the field of immersive media. Embodiments concerns improvements for the immersive media communication or immersive media content presentation among multiple participants, for example in video conferencing applications or virtual reality, VR, applications, like online gaming applications. Embodiments concern 360° video communication applications such as telepresence/teleconferencing applications.

Immersive media has been gaining a lot of attention in the last years. Key technologies for the presentation or representation of immersive media content may be categorized into
  (i) 3DoF, three Degrees of Freedom, content, e.g. 360° videos,
  (ii) 6DoF, six Degrees of Freedom, content, e.g., captured volumetric objects, like real objects, or volumetric videos of, e.g., real objects,
  (iii) 3D objects generated using, e.g., computer graphics, like Computer-Generated Imagery, CGI, and consisting, e.g., of 3D meshes and 2D textures.

A combination of these technologies is also possible. For example, multiple volumetric objects may be presented to a user overlaid on a 360° video played in the background. The presented volumetric objects may be dynamic sequences or computer-generated 3D objects. 360° video gained a lot of attention in the last years and some products for 360° applications appeared on the market. Standardization activities specify streaming and encoding of 360° video data. The work in this field primarily focuses on streaming of 360° video using the Hypertext Transfer Protocol, HTTP, or broadcast/broadband transmissions.

An enabling technology that has recently become the center of attention for various immersive applications is volumetric video. Volumetric videos capture the three-dimensional space in a realistic way and may provide a better immersion compared to 360° videos. Volumetric videos are also suitable for the representation of six degrees-of-freedom, 6DoF, content allowing a viewer to freely move inside the content and observe the volumetric objects from different points of views and distances.

Recently, various technologies have been emerging for capturing, processing, compressing and streaming of volumetric content. One prominent example in the compression domain is the Video-based Point Cloud Compression, V-PCC, standard. V-PCC encodes a point cloud into different video bitstreams, like texture, geometry, occupancy map, plus additional metadata. Applying existing video compression algorithms for point cloud compression brings very high compression efficiency and enables re-using the available hardware video decoders especially on mobile devices. Different to the 360° videos, volumetric videos are usually represented in 3D formats, e.g. point clouds, meshes and the like, which may require different processing and transmission techniques for efficient delivery. When multiple volumetric objects, captured or computer-generated, are present in a scene, the positions and relations of the objects with each other may be described using a scene graph whose nodes represent the entities present in the scene. A scene description language, e.g. X3D, may be used to construct the scene graph that describes the objects. Delivering multiple 3D objects may increase the bandwidth requirements and require tight synchronization of the playback of the volumetric objects.

Video communication typically runs over RTP/RTCP (Real-Time/Real-Time Control Protocol). In RTP, access units, AUs, are split into RTP packets which contain a header and the content of the video. Before the actual transmission of the video, a negotiation phase typically occurs during which both end points, the server and the receiver, exchange capabilities and agree on the characteristics of the video and modes to be used for the video communication. In order to describe characteristics of the transmitted bitstream as well as the transmission mode in use, the Session Description Protocol, SDP, may be used. The SDP may be used for a capabilities negotiation, e.g., in the so-called offer/answer model. For example, when considering a High Efficiency Video Coding, HEVC, bitstream, the server may send respective parameter sets, e.g., the sprop-parameter-sets, wherein the transmission may be out-of-band, i.e., may not be within the actual transmission of the video data. The client may accept the parameters as they are.

The RTP control protocol, RTCP, enables a periodic transmission of control packets to all participants in a session. The RTCP is primarily used to provide feedback on the quality of media transmission. RTCP control packets are periodically exchanged among the endpoints. In a point-to-point scenario, the RTP sender and the RTP receiver may send reciprocal sender reports, SR, and receiver reports, RR, to each other. The RTCP receiver reports indicate the reception quality and include, for example, one or more of the following QoS, quality of service metrics: cumulative number of packets lost, loss fraction, inter-arrival jitter, and timing information, like a timestamp of a last sender report received, LSR, or a delay since the last sender report has been received, DLSR. Typically, RTCP packets are not sent individually but are packed into compound packets for transmission and sent in relatively large time intervals so that the overhead caused by the RTCP packets does not drastically increase, for example, it is kept around 5% of the traffic, although an explicit configuration may change this number. Also, typically, there is a minimum interval, for example around 5 seconds, between two RTCP reports. However, some applications require a fast reporting for which such numbers are detrimental. For example, to achieve a timely feedback, the extended RTP profile for RTCP-based feedback, RTP/AVPF, in the RFC 4585 introduces the concept of early RTCP messages as well as algorithms allowing for low-delay feedback. This may be used to define application specific messages that allows steering or influencing encoding techniques and decisions in a delay critical manner.

The RTP allows carrying multiple media streams in a single RTP session, MRST, or multiple media streams in multiple RTP sessions, MRMT. An RTP endpoint may vary the bandwidth allocation to different streams and may dynamically change the bandwidth allocated to different synchronization sources, SSRCs, provided the total sending rate does not exceed its allocated share, as determined by a congestion control, for example, RFC 8108. The RTP may synchronize different media streams within the RTP session.

Sending multiple RTP media streams for a video may be particularly useful when layered codecs are used. In such a case, a Media Control Unit (MCU) may easily select what RTP streams to forward to adapt to varying network conditions without requiring transcoding of the content.

RFC 7798 specifies four different types of RTP packet payload structures. The payload structure is identified at the receiver by inspecting the type field in the payload header, and the four different types are illustrated in FIG. 1 of which FIG. 1(a) illustrates the structure of a single NAL, network abstraction layer, packet, FIG. 1(b) illustrates the structure of an aggregation packet, FIG. 1(c) illustrates the structure of a fragmentation unit, FU, and FIG. 1(d) illustrates the structure of a payload content information, PACI. The single NAL unit packet depicted in FIG. 1(a) contains a single NAL unit in the payload, and the payload header may be a copy of the NAL unit header. The aggregation packet, AP, depicted in FIG. 1(b) aggregates multiple NAL units to enable the reduction of packetizing overhead for small NAL units. The fragmentation unit depicted in FIG. 1(c) enables fragmenting a single NAL unit into multiple RTP packets. The PACI carrying RTP packet depicted in FIG. 1(d) modifies the basic payload header. The basic payload header is normally limited to 16 bits of the NAL unit header in order to reduce the packetization overhead. However, PACI packets allow extending the payload header through a Payload Header Extension Structure, PHES, to include easily accessible control information in the packet header. An example for a payload header extension is the Temporal Scalability Control Information described in RFC 7798, Section 4.5.

It is noted that the information in the above section is only for enhancing the understanding of the background of the invention and therefore it may contain information that does not form conventional technology that is already known to a person of ordinary skill in the art.

Starting from a conventional technology as described above, there may be a need for improvements or enhancements in the immersive media communication or immersive media content presentation when considering a multi-party video communication, for example a 360° video communication including multiple participants.

SUMMARY

An embodiment may have an apparatus for providing immersive media content to a plurality of receivers, wherein the apparatus is to acquire for a representation of the immersive media content a plurality of tiles, the plurality of tiles covering some or all of the representation, and for some or all of the plurality receivers, transmit to each receiver one or more of the tiles, the one or more tiles covering at least a viewport associated with the respective receiver.

Another embodiment may have an apparatus for presenting immersive media content, a representation of the immersive media content being represented by a plurality of tiles, the plurality of tiles covering some or all of the representation, wherein the apparatus is to receive from a transmitter one or more video or RTP streams, each stream comprising one or more of the tiles, and the tiles from the plurality of video or RTP streams covering at least a viewport associated with the apparatus, and acquire a single video stream to be presented to a user of the apparatus using the tiles received via the plurality of video or RTP streams.

Another embodiment may have a system, comprising: a sender comprising an apparatus for providing immersive media content to a plurality of receivers, wherein the apparatus is to acquire for a representation of the immersive media content a plurality of tiles, the plurality of tiles covering some or all of the representation, and for some or all of the plurality receivers, transmit to each receiver one or more of the tiles, the one or more tiles covering at least a viewport associated with the respective receiver, and a receiver comprising an apparatus for presenting immersive media content, a representation of the immersive media content being represented by a plurality of tiles, the plurality of tiles covering some or all of the representation, wherein the apparatus is to receive from a transmitter one or more video or RTP streams, each stream comprising one or more of the tiles, and the tiles from the plurality of video or RTP streams covering at least a viewport associated with the apparatus, and acquire a single video stream to be presented to a user of the apparatus using the tiles received via the plurality of video or RTP streams.

Another embodiment may have a method for providing immersive media content from a transmitter to a plurality of receivers, wherein the method comprises: acquiring for a representation of the immersive media content a plurality of tiles, the plurality of tiles covering some or all of the representation, and for some or all of the plurality receivers, transmitting to each receiver one or more of the tiles, the one or more tiles covering at least a viewport associated with the respective receiver.

Another embodiment may have a method for presenting at a receiver immersive media content, a representation of the immersive media content being represented by a plurality of tiles, the plurality of tiles covering some or all of the representation, the method comprising: receiving from a transmitter a plurality of video or RTP streams, each stream comprising one or more of the tiles, and the tiles from the plurality of video or RTP streams covering at least a viewport associated with the apparatus, and acquiring a single video stream to be presented to a user of the apparatus using the tiles received via the plurality of video or RTP streams.

Another embodiment may have a non-transitory digital storage medium having a computer program stored thereon to perform the method for providing immersive media content from a transmitter to a plurality of receivers, wherein the method comprises: acquiring for a representation of the immersive media content a plurality of tiles, the plurality of tiles covering some or all of the representation, and for some or all of the plurality receivers, transmitting to each receiver one or more of the tiles, the one or more tiles covering at least a viewport associated with the respective receiver, when said computer program is run by a computer.

BRIEF DESCRIPTION OF THE DRAWINGS

Embodiments of the present invention will be detailed subsequently referring to the appended drawings, in which:

FIGS. 1a-1d illustrates different payload structures, wherein FIG. 1(a) illustrates the structure of a single NAL, network abstraction layer, packet, FIG. 1(b) illustrates the structure of an aggregation packet, FIG. 1(c) illustrates the structure of a fragmentation unit, FU, and FIG. 1(d) illustrates the structure of a payload content information, PACI;

FIGS. 5*a*-5*c* schematically illustrates different transmission modes dependent on a network latency, wherein FIG. 5(*a*) illustrates a transmission mode for a low latency, FIG. 5(*b*) illustrates a transmission mode for a medium latency, and FIG. 5(*c*) illustrates a transmission mode for a high latency;

DETAILED DESCRIPTION OF THE INVENTION

Figure 1C:
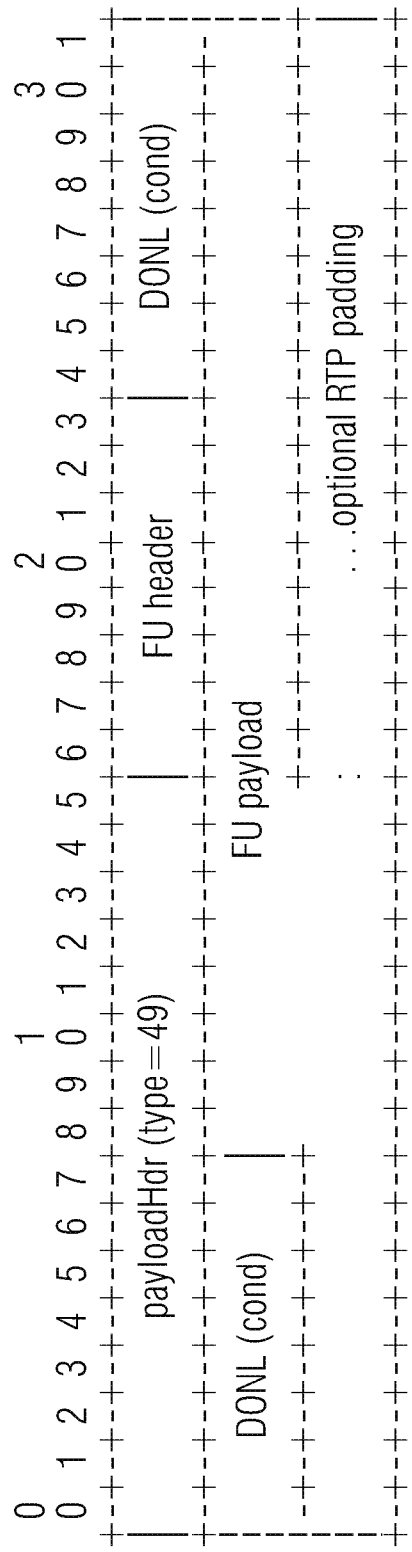
Figure 1D:
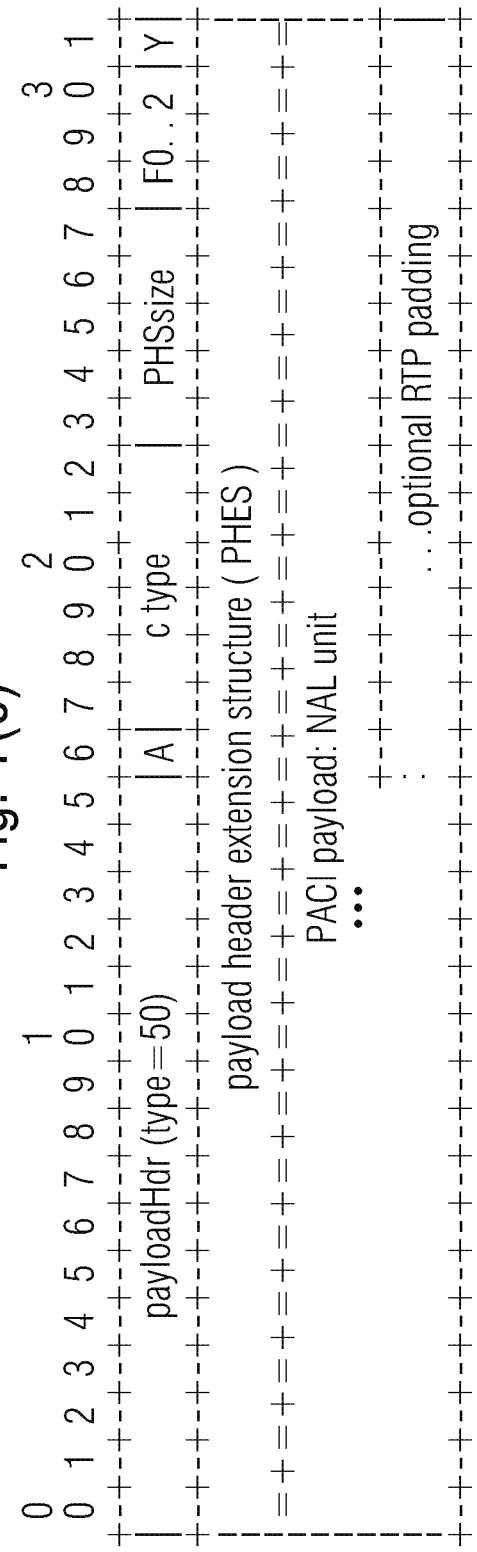

Embodiments of the present invention are now described in more detail with reference to the accompanying drawings, in which the same or similar elements have the same reference signs assigned.

In streaming applications the 360° video data for the entire 360° video is provided by a server towards a client, e.g., over the air by a broadcast/broadband transmission or over a network, like the internet, using HTTP, and the client renders the received video data for display. Thus, the entire video content is provided to the receiver. In video communication applications, for example, video conferencing or virtual reality, VR, applications such as online gaming applications, in general only a part of a scene of the 360° video is presented to a user at the receiver, e.g., dependent on a viewing direction of the user. The client, on the basis of the viewing direction, processes the entire video data so as to display to a user that part of the scene of the 360° video corresponding to the user's viewing direction. However, providing the entire video data for the 360° video to the receiver requires high transmission capabilities of the link between the sender and the receiver. Also, the receiver needs to have sufficient processing power to process the entire video data so as to present the desired part of a scene to a user. Since some the 360° video communication applications may be real time applications, the long duration or time associated with the transmission and/or processing of the entire data may be disadvantageous.

The above-described drawbacks become even more prominent in scenarios in which multiple participants or users are involved, e.g., in a multi-party 360° conferencing scenario. In a multi-party 360° conferencing scenario a group of physically present participants may be sitting around a table in a conference room. A 360° camera and a viewing screen, like a TV screen, are provided in the conference room. There may be remote participants, i.e., participants not physically present in the conference room, who are interested in joining the meeting through a conference call. The remote participants that join the conference call may see a part of the 360° video on their respective UEs, also referred to as remote UEs. The remote UEs may be of different types, for example a remote UE may be a head-mounted display, HMD, a mobile phone, a tablet or the like.

In such a scenario the 360-video may be generated using both in-camera stitching and network-based stitching. In the case of in-camera stitching, the 360° camera in the conference room generates a projected 360° video and sends the video either to a conferencing server for further processing, like RTP packaging, or sends parts thereof directly to the one or more remote UEs in respective viewport-dependent RTP streams, i.e., each UE receives a viewport-dependent RTP stream. In case of network-based stitching, the conference room may send the 2D views of the 360-camera to a server, like a conferencing server which then performs the stitching and creates the above-mentioned respective viewport-dependent RTP streams for each UE that are then distributed to the remote UEs. The server implemented scenario may be used in situations where the conference room does not have enough processing power to generate a 360° video so that the processing is offloaded to a network entity generating the stitched video. Employing the above-described 360° video streaming mechanisms in such a conferencing scenario may not meet the requirements for a real-time implementation, so the above-described mechanisms may not be suitable in such scenarios, like a telepresence or a teleconferencing application, due to the different aspects and different requirements when compared to the 360° video streaming mechanisms.

Figure 2:
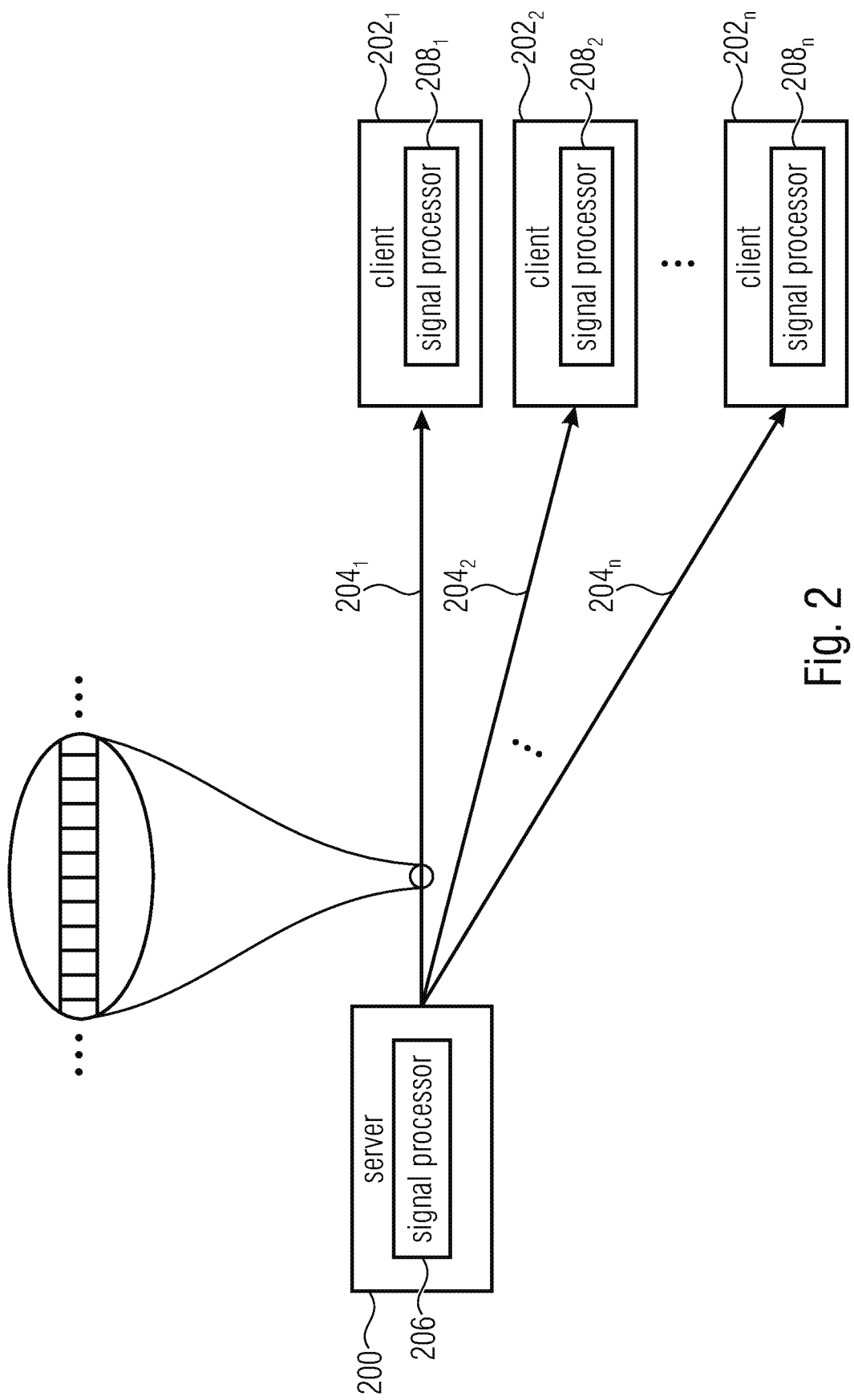
FIG. 2 is a schematic representation of a system for a multi-party immersive media content communication or a 360° multi-party video communication between a sender and a plurality of receivers.

Embodiments of the present invention provide different aspects for improving immersive media communication or immersive media content presentation for a multi-party video communication. FIG. 2 is a schematic representation of a system for a multi-party immersive media content communication or a 360° multi-party video communication between a sender 200, also referred to as a server, and a plurality of receivers $202_1$ to $202_n$, also referred to as clients, participants or remote UEs. The server 200 and the clients $202_1$ to $202_n$ may communicate via a wired communication link or via a wireless communication link for transmitting media streams $204_1$ to $204_n$ including video or picture and/or audio information. More specifically, a media stream includes the 360° video data as provided by the server 200, for example in respective RTP packets. In addition, respective RTCP packets are included in the media stream as explained above. The server 200 includes a signal processor 206, and the clients $202_1$ to $202_n$ include respective signal processors $208_1$ to $208_n$. In accordance with embodiments of the present invention, an improved approach for providing the necessary content to the participants of a multi-party video communication system is described, which addresses the problems found in conventional technology approaches by employing viewport-dependent tiled transmission techniques. In accordance with the viewport-dependent tiled transmission a picture or representation of the content, for example the picture generated by the 360° camera of the video conferencing system, is encoded into a plurality of tiles and those tiles associated with a viewport of a receiver are transmitted from the system to the receiver. The clients $202_1$ to $202_2$ as well as the server 200 depicted in FIG. 2 may operate in accordance with the inventive approach described herein below in more detail.

Sender/Server for Immersive Media Presentation

The present invention provides an apparatus for providing immersive media content to a plurality of receivers, wherein the apparatus is to obtain for a representation of the immersive media content a plurality of tiles, the plurality of tiles covering some or all of the representation, and for some or all of the plurality receivers, transmit to each receiver one or more of the tiles, the one or more tiles covering at least a viewport associated with the respective receiver.

In accordance with embodiments, the apparatus comprises a source of the immersive media content, e.g., a 360° camera of a teleconferencing or telepresence system, the source providing the representation of the immersive media content, wherein, to obtain the plurality of tiles, the apparatus is to encode the representation from the source into the plurality of tiles, and wherein the apparatus is to establish a session, like an RTP session, with the receivers, and to transmit to each receiver one or more of the tiles using one or more video streams, like RTP streams.

In accordance with embodiments, the apparatus, e.g., a teleconferencing or telepresence server, is connectable to an external source of the immersive media content, e.g., a 360° camera of a teleconferencing or telepresence system, the source providing the representation of the immersive media content, the apparatus is to receive the representation of the immersive media content from the external source, to obtain the plurality of tiles, the apparatus is to encode the representation from the source into the plurality of tiles, and the apparatus is to establish a session, like an RTP session, with the receivers, and to transmit to each receiver one or more of the tiles using one or more video streams, like RTP streams.

In accordance with embodiments, the apparatus, e.g., a teleconferencing or telepresence server, is connectable to an external source of the immersive media content, e.g., a 360° camera of a teleconferencing or telepresence system, the source providing the representation of the immersive media content in a tiled form, to obtain the plurality of tiles, the apparatus is to receive the tiled representation of the immersive media content from the external source, and the apparatus is to establish a session, like an RTP session, with the receivers, and to transmit to each receiver one or more of the tiles using one or more video streams, like RTP streams.

In accordance with embodiments, the apparatus is to
receive viewport information from each of the receivers, and
transmit, responsive to the viewport information, to each of the receivers a plurality of video or RTP streams, each video stream including one or more tiles covering the viewport of the respective receiver.

In accordance with embodiments,
to obtain the plurality of tiles, the apparatus is to encode the representation into the plurality of tiles, and packetize each tile into one video stream, e.g., an RTP stream, and
the apparatus is to transmit to each of the receivers a different set of tiles covering at least the viewport of the receiver.

In accordance with embodiments, the number of the video or RTP streams transmitted by the apparatus is equal to the number of tiles.

In accordance with embodiments, the apparatus is to cluster and packetize a plurality of tiles into one RTP stream In accordance with embodiments, the viewport associated with some or all of the receivers is a common viewport.

In accordance with embodiments, the common viewport of the respective receivers is a viewport of one or more certain receivers or is a predefined viewport set by the apparatus.

In accordance with embodiments, the apparatus is to
provide the immersive media content to the plurality of receivers during a session, e.g., an RTP session, and
transmit the tiles covering at least the common viewport during the whole session or during one or more certain time periods during the session.

In accordance with embodiments, the apparatus is to
receive from one of the receivers a signaling, e.g., during an SDP negotiation, that the one receiver is a leader receiver, responsive to the signaling, instruct some or all of the other receivers to not send viewport information, like a RTCP feedback messages with a viewport, and
responsive to viewport information from the leader receiver, transmit to some or all of the remaining receivers a plurality of video or RTP streams, each video stream including one or more tiles covering at least a viewport of the leader receiver.

In accordance with embodiments, the apparatus is to
transmit to a first group of the receivers a plurality of video or RTP streams, each video stream including one or more tiles covering at least a first common viewport of the respective receivers, and
transmit to a second group of the receivers a plurality of video or RTP streams, each video stream including one or more tiles covering at least a second common viewport of the respective receivers.

In accordance with embodiments,
the first common viewport of the respective receivers is a viewport of a first one of the plurality of receivers or a predefined first viewport set by the apparatus, and
the second common viewport of the respective receivers is a viewport of a second one of the plurality of receivers or a predefined second viewport set by the apparatus.

In accordance with embodiments, the apparatus is to
receive from a receiver a signaling indicating the first one or the second one of the receivers, and
responsive to the signaling, transmit to the receiver one or more tiles covering at least the viewport of the indicated receiver.

In accordance with embodiments, the apparatus is to transmit the one or more tiles covering at least the common viewport to the respective receivers using the same encodings or different encodings In accordance with embodiments, the apparatus is to use different encodings for the tiles dependent on one or more of:
different network conditions between the receivers and the apparatus,
a minimum acceptable quality requirement of a receiver,
a decoding capability of a receiver In accordance with embodiments, responsive to the viewport information from a receiver, the apparatus is to encode the tiles corresponding to the areas in the receiver's viewport in a quality or resolution being higher than a quality or resolution for tiles corresponding to the areas outside the receiver's viewport.

In accordance with embodiments, dependent on a latency, at a link between the apparatus and a receiver, the apparatus is to
transmit tiles only inside the receiver's viewport, or
transmit tiles inside the receiver's viewport and a number of tiles outside the receiver's viewport, the number increasing with an increase in latency at the link.

In accordance with embodiments, the apparatus is to
transmit tiles only inside the receiver's viewport, in case the latency is at or below a first threshold,
transmit tiles for a larger area than the receiver's viewport, but not the whole representation, in case the latency is above the first threshold and at or below a second threshold, or
transmit tiles for the whole representation, in case the latency is above the second threshold.

In accordance with embodiments, the apparatus is to transmit the tiles outside the receiver's viewport with the same resolution or quality or with a resolution or quality lower than the tiles inside the receiver's viewport.

In accordance with embodiments, the apparatus is to transmit the tiles outside the receiver's viewport with a resolution or quality decreasing with a distance of the tiles to the receiver's viewport.

In accordance with embodiments, the apparatus is to
   receive viewport information from each of the receivers, and
   for a given receiver, select, responsive to the viewport information, a subset of tiles, e.g., a subset that maximizes a viewport quality of the given receiver UE, and perform tile stitching, and
   transmit to each of the receivers a viewport-optimized stream in a single RTP stream.

In accordance with embodiments, the apparatus is to vary a bandwidth allocated to the respective video or RTP streams.

In accordance with embodiments, the apparatus is to encode the tiles to be transmitted to a receiver so as to allow the receiver to stitch the tiles together to obtain a valid bitstream.

In accordance with embodiments, the apparatus is to signal a stitchability property of the transmitted tiles, e.g., using the Session Description Protocol, SDP.

In accordance with embodiments, the apparatus is to group the tiles into a plurality of groups, e.g., dependent on certain properties of the tiles, like the quality, to associate the respective groups with different sources, and signal to a receiver for each source the payload format and codec-specific attributes, e.g., an aggregate level and/or an alternative resolution/quality for the tiles.

In accordance with embodiments, the apparatus is to signal to a receiver a switching point for a spherical location of the user viewport or a tiling configuration using an RTP header or a payload header extension, like a PACI packet.

In accordance with embodiments, the apparatus is to signal
   information about a spherical location of the receiver's viewport inside the immersive media content or the tiling configuration, or
   that a current spherical location or a current tiling configuration, e.g., a quality or resolution or number of tiles, is modified at a future time, e.g., expressed in a distance in time, representations or packets.

In accordance with embodiments, the apparatus is to switch a spherical location or a tiling configuration at predefined intervals, e.g., at a minimum distance in time, representations or packets between region-wise-packing, RWP, or tiling changes.

In accordance with embodiments, the apparatus is to signal to a receiver a length of a slice header, e.g., using an RTP header or a payload header extension, like a PACI packet.

In accordance with embodiments, the apparatus is to perform bitrate adaptation, so that tiles may be transmitted to the receivers with different bitrates.

In accordance with embodiments, the apparatus is to perform a bitrate adaptation based on RTCP receiver reports, e.g., reports indicating a network condition at a link between the apparatus and a receiver.

In accordance with embodiments,
   when a session between the apparatus and a receiver starts, the apparatus is to initially encode all tiles with a single uniform bitrate or with a uniform resolution and to start transmitting the tiles to the receiver, and responsive to a RTCP feedback messages from the receiver, the apparatus is to prioritize the bitrate of the tiles corresponding to the viewport of the remote UE, e.g., by encoding the tiles within the viewport with a resolution or quality higher than for tiles outside the viewport.

In accordance with embodiments, responsive to a minimum quality/resolution requirement inside a receiver's viewport, the apparatus is to arrange the set of transmitted tiles such that the minimum quality requirement of the receiver is fulfilled, e.g., by reducing a resolution/quality of non-viewport tiles, or by sending a limited set of tiles.

In accordance with embodiments, responsive to a change of available network bandwidth, the apparatus is to reduce/increase the bitrate of all transmitted tiles equally until the total sum of the bitrates satisfies the bandwidth budget.

In accordance with embodiments, the apparatus is to consider an actual user viewport when performing bitrate adaptation.

In accordance with embodiments, in case the available network bandwidth decreases, the apparatus is to perform one of the following:
   keep the viewport-tiles at a consistent quality while reducing the bitrates of the non-viewport tiles, or
   reflect the decrease in an equal manner to viewport- and non-viewport-tiles such that there is a uniform decrease in bitrates of all transmitted tiles, or
   keep non-viewport-tiles at the same quality as before and decrease the bitrates of the viewport-tiles more significantly.

In accordance with embodiments, in case the available network bandwidth increases, the apparatus is to perform one of the following:
   assign the additional throughput budget to the viewport-tiles and keep the non-viewport tiles in the same quality, or
   increase the bitrates of all tiles in an equal manner, or
   keep the viewport-tiles in the same bitrate and distribute the additional throughput budget to the non-viewport tiles.

Receiver/Client for Immersive Media Presentation

The present invention provides an apparatus for presenting immersive media content, a representation of the immersive media content being represented by a plurality of tiles, the plurality of tiles covering some or all of the representation, wherein the apparatus is to
   receive from a transmitter one or more video or RTP streams, each stream including one or more of the tiles, and the tiles from the plurality of video or RTP streams covering at least a viewport associated with the apparatus, and
   obtain a single video stream to be presented to a user of the apparatus using the tiles received via the plurality of video or RTP streams In accordance with embodiments, the apparatus is to receive a signaling about a position of a tile carried by video or RTP stream in the viewport of the apparatus, e.g., using an RTP header extension or an RTP payload header extension, so as to combine the individual video or RTP streams in a correct way into the single video stream.

In accordance with embodiments, the tiles are encoded in the one or more video or RTP streams so as to allow the apparatus to stitch the tiles together to obtain the single video stream.

In accordance with embodiments, the apparatus is to receive a stitchability property of the transmitted tiles, e.g., using the Session Description Protocol, SDP.

In accordance with embodiments, to obtain the single video stream, the apparatus is to de-packetize the individual video or RTP streams, perform tile stitching, decode and render the single video stream.

In accordance with embodiments, the viewport associated with the apparatus is the viewport of the apparatus, and the apparatus is to send viewport information to the transmitter, e.g., using an RTCP feedback message.

In accordance with embodiments, the apparatus is to signal to the transmitter, e.g., during an SDP negotiation, that the viewport of the apparatus is to be used as a viewport for one or more further devices receiving the immersive media content.

In accordance with embodiments, the viewport associated the apparatus is a common viewport, the common viewport being a viewport of one of a plurality of further devices receiving the immersive media content, or being a predefined viewport set by the transmitter.

In accordance with embodiments, the apparatus is to receive a signaling that the viewport associated the apparatus is a common viewport, and, responsive to such signaling the apparatus is not to send viewport information to the transmitter.

Receiver/Client and Sender/Server for Immersive Media Presentation

In accordance with embodiments, the immersive content includes one or more of:
- 3DoF, three Degrees of Freedom, content, e.g. one or more 360° videos,
- 6DoF, six Degrees of Freedom, content, e.g. captured volumetric objects, like real objects, or volumetric videos of, e.g., real objects,
- 3D objects generated, e.g., using computer graphics, like Computer-Generated Imagery, CGI.

In accordance with embodiments, the immersive content to be transmitted by the sender or received by the receiver includes one or more of:
- in case of a 360° video or a 360° graphic, a projected video transmission, e.g., a part of the full 360° video transmitted using a particular projection,
- in case of a volumetric object or a volumetric video, a 3D data transmission for the full volumetric object or for a part of the volumetric object in a certain 3D format, e.g., as a point cloud or as a mesh,
- in case of 3D computer graphics, e.g., games, a complete scene, e.g., multiple volumetric objects, in a certain 3D format such as multiple point clouds or meshes.

In accordance with embodiments, the immersive content is to be identified by
- a certain Supplementary Enhancement Information, SEI, parameter, e.g., the sprop-sei parameter, or
- an indication of a particular video codec or profile, or
- an additional attribute in the Session Description Protocol, SDP, e.g., "videoformat 3DoF" or "videoformat 6DoF" or "videoformat Volumetric".

In accordance with embodiments, in case the immersive content represents a volumetric scene including one or more volumetric objects, the individual video or RTP streams includes a plurality of sub-streams for describing respective properties of the volumetric object, e.g., at least a texture bit stream and a geometry bitstream, or a compressed mesh bit stream and a texture bitstream.

In accordance with embodiments, the use of the different sub-streams is signaled using, e.g., the SDP, wherein the SDP may contain information about the different kind of bitstreams and possible variants of the bitstreams.

In accordance with embodiments, the plurality of sub-streams describing respective properties of a volumetric object are associated with each other using, e.g., the grouping mechanisms of the SDP.

System for Immersive Media Presentation

The present invention provides a system, comprising:
a sender including an inventive apparatus, and
a receiver including an inventive apparatus.

In accordance with embodiments, the sender comprises
- a teleconferencing or telepresence device including a source of the immersive media content, e.g., a 360° camera, or
- a teleconferencing or telepresence server connectable to an external source of the immersive media content, e.g., a 360° camera of a teleconferencing or telepresence system.

Method for Immersive Media Presentation

The present invention provides a method for providing immersive media content from a transmitter to a plurality of receivers, wherein the method comprises:
obtaining for a representation of the immersive media content a plurality of tiles, the plurality of tiles covering some or all of the representation, and
for some or all of the plurality receivers, transmitting to each receiver one or more of the tiles, the one or more tiles covering at least a viewport associated with the respective receiver.

The present invention provides a method for presenting at a receiver immersive media content, a representation of the immersive media content being represented by a plurality of tiles, the plurality of tiles covering some or all of the representation, the method comprising:
receiving from a transmitter a plurality of video or RTP streams, each stream including one or more of the tiles, and the tiles from the plurality of video or RTP streams covering at least a viewport associated with the apparatus, and
obtaining a single video stream to be presented to a user of the apparatus using the tiles received via the plurality of video or RTP streams.

In accordance with embodiments, the receiver includes an inventive apparatus, and/or wherein the sender includes an inventive apparatus.

Computer Program Product

The present invention provides a computer program product comprising instructions which, when the program is executed by a computer, causes the computer to carry out one or more methods in accordance with the present invention.

Figure 3:
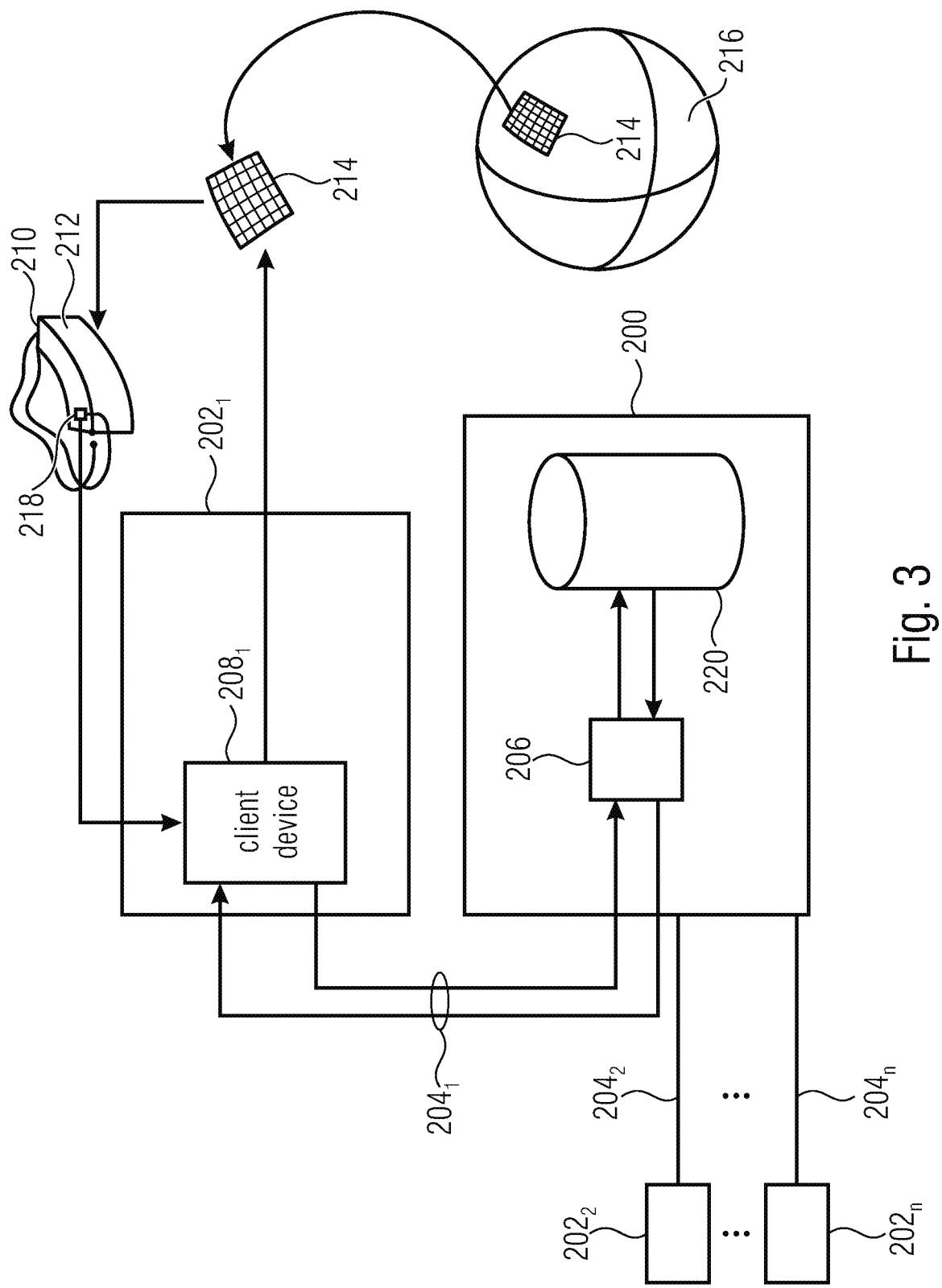
FIG. 3 is an example of an environment, similar to FIG. 2, in which embodiments of the present invention may be applied and advantageously used.

More detailed embodiments of the inventive approach are now described. FIG. 3 shows an example of an environment, similar to FIG. 2, in which embodiments of the present invention may be applied and advantageously used. FIG. 3 shows a system including the server 200 and the clients 202$_1$ to 202$_n$ set up for an efficient immersive media communication or immersive media content presentation or for a 360° video communication. Client 202$_1$ is illustrated in more detail and the other clients are illustrated only schematically. The other clients 202$_2$ to 202$_n$ may have the same or a different structure than client 202$_1$. The system presents to a user wearing a head-up display 210, for example, using an internal display 212 of the head-up display 204, a view selection 214 of a temporarily-varying spatial scene 216 of the 360° video corresponding to a certain viewing direction. The view selection or the viewing direction 214 may correspond to an orientation of the head-up display 210 that may be measured by an internal orientation sensor 218.

Thus, the selection 214 presented to the user is a selection of the spatial scene 216, and the spatial position of the spatial scene 216 corresponds to the orientation of the head-up display 210. The temporally-varying spatial scene 216 includes immersive media content or is a 360° video, also referred to as an omnidirectional video or a spherical video. The present invention is not limited to head-up displays, rather, in accordance with other embodiments, the selection 214 may be displayed to a user on another display device, like a regular monitor or the like. The sensor 218 and the display 210 may be separate or different devices, such as a remote control and a corresponding television set. In accordance with other embodiments, the sensor 218 and the display 212 may be part of a hand-held device, like a mobile device, such as a tablet or a mobile phone.

The server 200 may comprise a controller 206, for example, implemented using the signal processor 206 of FIG. 2, and a storage 220. The controller 206 may be an appropriately programed computer, an application-specific integrated circuit or the like. The storage 202 may store media segments which represent the spatial scene 216. The controller 206, responsive to requests from the client 202, may send to the client 202 media segments, for example requested video/audio data, together with respective control information. The controller 206 may fetch the requested media segments from the storage 220 and, in accordance with embodiments, may provide the video data towards the client 202 either as a rendered version of the view section 214 also referred to as a rendered viewport, or may provide to the client 202 the video data as projected data, i.e., without any rendering.

The client 202 may include a client device or controller 208, for example, implemented using the signal processor 208 of FIG. 2, and may be an appropriately programed computer, a microprocessor, a programed hardware device and the like. The client device 208 may select the media segments to be retrieved from the server 200 together with respective control information. The transmission of the data within the media stream 204 is performed in encoded form so that the respective entities in the server 200 and the client 202, for example the controllers 206 and 208, include respective encoders/decoders.

Embodiments of the present invention concern the presentation of immersive media content during which the server and the clients interact, and the server provides viewport-dependent video data using tiled transmission techniques. Embodiments of the present invention define mechanisms and a signaling to allow for a multi-party video communication to use viewport-dependent tiled transmission techniques. In accordance with embodiments an RTP-based multi-party 360° video conferencing approach using HEVC tiles is provided. In accordance with this embodiment, multiple point-to-point links between a conference room and each remote participant, for example each remote UE, may be implemented, or a point-to-multipoint link may be implemented between a conferencing server, which receives a 360° video from a conference room, and multiple remote participants. Further embodiments describe signaling mechanisms, like SDP-based session negotiations/descriptions for the tiled delivery of a 360° video to multiple remote UEs. Further embodiments concern PACI, Payload Content Information, signaling aspects for the tiled delivery of the video information, for example in the context of a tiled conferencing. Yet further embodiments concern a bitrate adaptation using different resolutions or quality levels and implications thereof on region-wise packing, RWP, and the like.

Embodiments of the inventive approach are described in more detail below with reference to a 360° video conferencing scenario, however, the inventive concept is not limited to such embodiments. Rather, in accordance with other embodiments, the inventive concept may be applied to any kind of immersive media content including, e.g., 3DoF and 6DoF content. For example, the subsequently described embodiments may be employed for volumetric video in scenarios in which in multiple users participate and have different views on a certain scene.

In the subsequent description, when referring to "tiles", in case of 3DoF video, like 360° video, this refers to a tile, like a HEVC tile, defining a part of a representation of the content. In case of 6DoF, like a volumetric object or video or a 3D computer graphic, the term "tiles" refers to a point cloud or mesh or brick defining a part of a representation of the content.

When referring to the "representation of the immersive media content", in case of 3DoF video, this refers, e.g., to at least a part of an inner surface of a sphere. In case of 6DoF video "representation of the immersive media content" refers, e.g., to at least a part of an outer surface of an object.

When referring to a "viewport", in case of 3DoF video, this is the viewport or viewing direction of the user. A user may change his viewport, for example, by moving his head in case of wearing a HMD, but the user has a static viewpoint which corresponds to the center of the scene or representation from which he is observing the content, like the spherical content. In case of 6DoF video, the viewport refers to a viewpoint because the user may perform translational movements in the space. Thus, the term viewport may be understood as the viewport in the 3DoF cases and as the viewpoint in the 6DoF cases.

Figure 4:
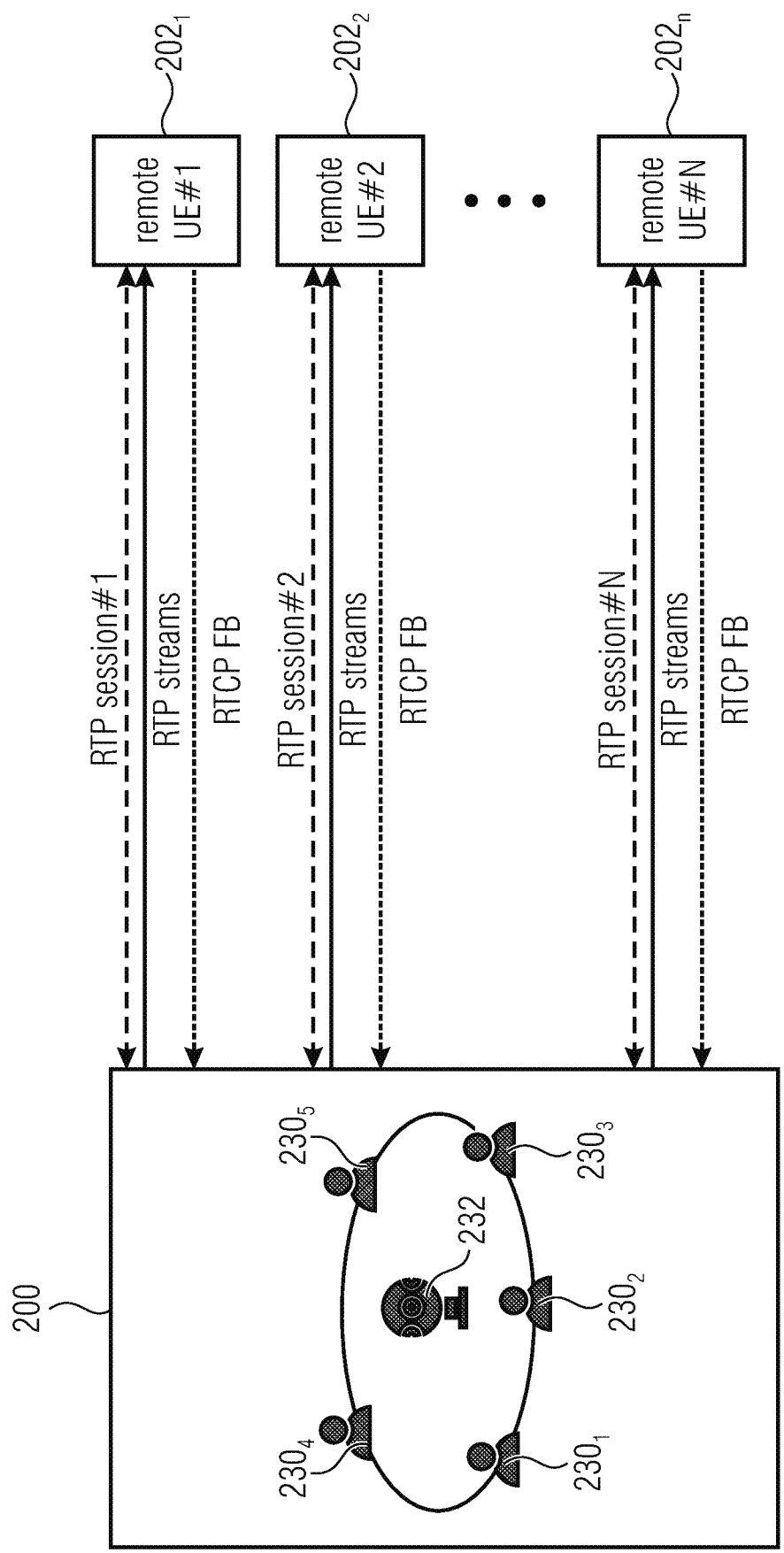
FIG. 4 illustrates an embodiment of a tiled multi-party RTP delivery for a 360° video conferencing scenario using a direct communication between the conference room and remote UEs.

FIG. 4 illustrates an embodiment of a tiled multi-party RTP delivery for a 360° video conferencing scenario using a direct communication between the conference room and the remote UEs. The conferencing room 200 provides the 360° video information to the respective remote UEs $202_1$ to $202_n$ in respective RTP sessions #1 to #N within which one or more RTP streams and RTCP feedback may be provided. FIG. 4 is an example of a point-to-point approach in which several point-to-point links, i.e., a direct communication, exists between the conference room 200 and the remote UEs $202_1$ to $202_n$. In this embodiment, there is no further server present and it is assumed that the conference room is capable of encoding the stitched 360° video into the independent HEVC tiles and packaging the tiled encodings into the different RTP streams. For example, a separate RTP stream may be used for the transmission of each tile. In other words, each remote UE $202_1$ to $202_n$ establishes a point-to-point RTP session #1 to #N with the conference room 200 and joins the conference. The remote UEs $202_1$ to $202_n$ may send their viewport information to the conference room 200, for example using RTCP feedback, FB, messages. FIG. 4 illustrates schematically the conference room 200 with a number of physically present participants $230_1$ to $230_5$. The conference room 200 includes a 360° camera 232. The conference room 200 may use a tiling configuration of 6×4 tiles, and each tile is packetized into one RTP stream. Each remote UE $202_1$ to $202_n$, dependent on its actual viewport, may receive a different set of 24 RTP streams covering the whole 360° video and the tiles corresponding to the area of a viewport of a UE may be encoded and transmitted in a quality or resolution that is higher than the quality or resolution of tiles not corresponding to the viewport of a UE. In accordance with embodiments, dependent on the network conditions at the link between the UEs and the conference room 200, a bitrate adaptation may be performed, as described in more detail below, so that different remote UEs may receive tiles with different bitrates.

In accordance with embodiments, the corresponding position of the tile carried by an RTP stream in the remote UE's viewport is also signaled, for example, using the RTP header extension or the RTP payload header extension. This allows the remote UE $202_1$ to $202_n$ to properly combine the individual RTP streams allowing each remote UE to reconstruct the 360° video in such a way the UE presents in its viewport the part of the conference using high resolution or quality tiles as received.

Thus, in accordance with embodiments of the present invention, a different set of tiles may be provided to different remote UEs. In accordance with such an embodiment, the conference room, considering the viewport information received from the respective UEs, may send a different set of RTP streams, at different time instances, to the respective remote UEs, advantageously using high resolution or high quality tiles to cover the viewport. The remote UEs $202_1$ to $202_n$ may signal their viewport information to the conference room 200 using RTCP FB messages. Since the different remote participants may be interested in viewing different parts of the 360° video at a given time instance, the conference room 200 may transmit a different set of tiles in each RTP session #1 to #N.

In accordance with embodiments, the conference room 200 may employ different transmission modes dependent on a network condition on the link between the conference room and the respective UEs, for example dependent on a latency. For example, based on the RTCP receiver reports provided by the respective UEs to the conference room 200, the conference room may estimate a network latency and, based on the latency on the respective links, may decide to use different transmission modes dependent on the latency. FIG. 5 schematically illustrates the different transmission modes dependent on a network latency, and FIG. 5(a) illustrates a transmission mode for a low latency, FIG. 5(b) illustrates a transmission mode for a medium latency, and FIG. 5(c) illustrates a transmission mode for a high latency. FIG. 5 assumes a tiling configuration of 8×6 meaning that a picture 240 of the video content is encoded into 48 tiles 242, and a viewport 244 may include 6 tiles.

In case of a low latency, for example a latency being below a first predefined or preconfigured threshold, only the tiles inside the viewport 244 are transmitted because it is possible to quickly adapt to a new or changing viewport as signaled by a user. Thus, as is depicted in FIG. 5(a), only the tiles for the viewport 244 are transmitted and no tiles for the parts outside the viewport are transmitted.

In case of a medium latency, for example in case the latency is above the first threshold but below a second predefined or preconfigured threshold, the conference room 200 may decide to transmit a larger area than the viewport 242, for example the area 246 including 20 tiles of the picture 240. More specifically, the 6 tiles for the viewport 244 are transmitted, and, in addition, 14 tiles surrounding the viewport 244 are also transmitted. This allows some buffer area 246 around the viewport 244 but still not the entire picture 240 or all tiles thereof are transmitted. The tiles for the buffer area 246 may be transmitted in the same quality as the viewport area 244 or at a lower quality. In the example depicted in FIG. 5(b), it is assumed that the tiles in the buffer area 246 are sent with a lower quality.

In case of a high latency, for example in case the latency exceeds the second threshold, the conference room 200 may decide to transmit the whole picture 240, as is depicted in FIG. 5(c). The tiles outside the viewport 244 may be transmitted with the same or with a lower quality than the tiles inside the viewport 244. For example, all tiles outside the viewport may be transmitted with the same quality that is lower than the quality of the viewport 244, or the low quality part may gradually degrade so that, for example, the closest area 246 to the viewport 244 may be transmitted with a quality level Q1, and the next closest area 248 may be transmitted with a quality level Q2, and the furthest area, like the edges of the picture or frame, may be transmitted with a quality Qx with Q1>Q2> . . . >Qx.

In accordance with other embodiments, the conference room 200 may decide about the distribution of the available decoding power among the different quality levels. For example, it may be decided how much of the resolution budget is to be used for high resolution viewport tiles. For instance, when considering a medium or high latency situation, which may indicate a bad delay condition or when considering that fast changes in the region of interest, RoI, i.e., changes in the viewport, are possible, the conference room may decide to use 50% of the resolution budget for the viewport and 50% for the low resolution. On the other hand, in case of a low latency situation, for example in case of good delay conditions or in case a change of region of interest is not likely or is restricted, like on a tablet, 90% of the budget may be used for the high resolution processing and only a small thumbnail overview may be sent.

In the above-described embodiments, each of the remote UEs receives from the conference room a transmission of tiles covering at least a viewport of the respective UE. In other words, the above embodiments provided to the respective UEs individual streams carrying one or more tiles representing the respective viewport of the UE.

In accordance with other embodiments, rather than using such individual viewports, a common viewport, also referred to as a synchronized common viewport, may be employed. In accordance with such embodiments, the remote UEs or participants $202_1$ to $202_2$ may be interested in synchronizing the viewports, either during the whole conference or during a certain time period. Stated differently, at a given time instance, some or all of the remote participants may watch the same spatial portion of the 360° video, i.e., they have a common viewport.

In accordance with embodiments, the common viewport may be dynamically changed. For example, at the beginning of the conference call one of the remote participants may be selected as a leader remote participant. This may be signaled during the SDP negotiation, during which, for example, one of the UEs may send an SDP offer requesting to be the leader. The conference room 200 may accept this offer and instruct the other remote participants not to send any RTCP feedback messages with regard to the viewports because in such embodiments the viewports of the other participants are not relevant. For example, when considering UE $202_1$ as the leader UE, the conference room 200 instructs the remaining UEs $202_2$ to $202_n$ to not transmit any feedback related to their viewport because such UEs only see what the leader remote participant sees. In accordance with embodiments, this may be applied in a 2D viewing scenario in which the non-leader remote participants may follow the viewport of the leader remote participant on the display screen without the need to interact with the 360° content. The leader remote participant may be one of the kinds of UEs described above, e.g., an HMD, a mobile phone, a tablet or the like.

In accordance with further embodiments, during the conference call, a new leader remote participant may be assigned. For example, the new leader may be assigned through a further SDP negotiation. Any one of the remote participants may assume the role of the leader. In accordance with other embodiments, only some of the remote participants may have the privilege to assume the leader role. The privileged remote participants may be signaled, for example by the conference room, at the beginning of the conference. Only those selected participants may then request to become the leader any time during the conference call.

Once the leader remote participant or UE is determined, and after the RTP session starts, the leader remote UE may send RTCP feedback messages to the conference room containing its actual viewport. Responsive to receiving the viewport information from the leader UE, the conference room transmits to all remote UEs joining the conference a set of tiles corresponding to the same spatial area of the 360° viewport.

In accordance with further embodiments, rather than having only a single leader, there may be groups of followers that follow a certain leader. For example each group of followers may receive the viewport of their assigned leader. In this case, during the SDP handling, followers may indicate a leader, the viewport of which they like to receive. For example, this may be useful in a scenario where a large-scale conference call takes place with several physically present and remote participants. There may be smaller groups inside the conference room discussing on different topics and, in such a scenario, the remote participant may select a leader UE that shares the same interests and follow that UE's viewport. In case a follower remote UE wants to follow another discussion group at a later point, the UE may choose to be synchronized with a viewport of another leader UE.

In accordance with embodiments, the common viewport may be provided to the respective follower UEs with the same encoding or with different encodings. For example, in accordance with embodiments using the same encoding, the remote UEs may receive exactly the same encodings of the tiles corresponding to the leader remote participant's viewport, i.e., the follower UEs receive the same spherical region of the 360° video with the tiles encoded with the same bitrate, for example with the same resolution or the same quality. In such an embodiment, the conference room may perform transcoding/transrating only once and distribute the same tiled contents to all remote UEs.

In case of embodiments using different encodings, the remote UEs may receive different encodings of the tiles corresponding to the leader remote participant's viewport. In other words, although the remote UEs receive tiles corresponding to the same spherical region of the 360° video, the tiles may be encoded in different bitrates, for example with a different or adapted resolution or quality, for example considering the different network conditions on the link between the individual remote UEs and the conference room. Such network conditions, like the packet loss, the latency and the like, may be measured and signaled by the remote UEs using respective RTCP receiver reports. For example, some or all of the remote UEs that follow a leader UE may signal a minimal acceptable quality requirement so that the conference room sends tiles at a minimum quality regardless of the network conditions. In accordance with further examples, different UEs may have different decoding capabilities known at the conference room. The conference room takes into consideration the decoding capability of a UE when deciding on the quality levels of tiles to be sent to the follower UEs. In accordance with other embodiments, the available decoding power may be negotiated based on the delay conditions or the dynamics of the RoI change among the conference room and the UEs, for example a 90% versus 50% of resolution budget for tiles inside the viewport in a similar way as described above with reference to FIG. 5.

In accordance with yet other embodiments using a common viewport, rather than employing the viewport of one or more of specific UEs, like a leader UE, the observed common viewport may be static. In other words, the common viewport is not provided as the viewport of one of the UEs but is a viewport decided, for example, by the conference room or the system. In this case, there is no need for a viewport signaling from the remote UEs which, therefore, may be disabled. Hence, no RTCP FB messages with regard to the viewport information are necessary. In accordance with an embodiment, the conference room may, at the beginning of the conference, determine a certain viewport that is transmitted to all remote UEs, for example, a viewport covering a presenter or keynote speaker. In such an embodiment, in all RTP sessions, tiles covering the predetermined static viewport are transmitted to the remote UEs. In a similar way as described above with reference to FIG. 5, different bitrate encodings of the tiles may be transmitted to the remote UEs dependent on the network conditions or a minimum acceptable quality requirement signaled by the remote UEs.

In accordance with embodiments, the transmitted static viewport may be modified during the conference, for example based on a dominant speaker identification, an activity recognition or a similar kind of intelligent data processing.

In accordance with embodiments also for the static common viewport, the UEs may either receive the same encodings of the tiles corresponding to the selected static viewport or different encodings based on the network conditions as well as based on the negotiated minimum quality requirements.

Figure 6:
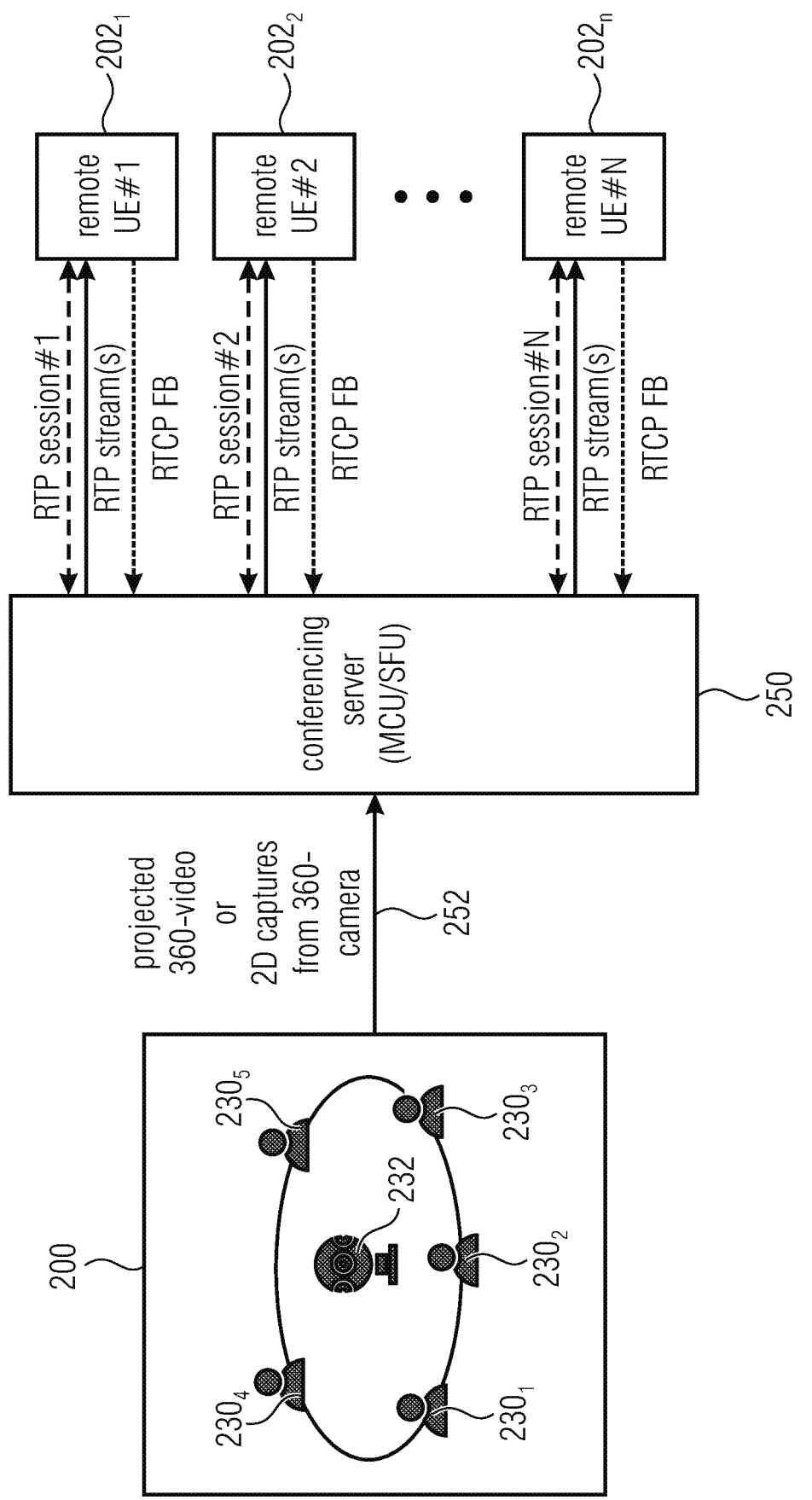
FIG. 6 illustrates an embodiment of a tiled multi-party RTP delivery for 360° conferencing via a conferencing server.

In accordance with further embodiments, in addition to the conference room 200, a conferencing server may be provided, for example a multipoint control unit MCU, enabling functionalities such as transcoding, transrating and mixing of videos in different layouts/formats as well as offloading processing from the end points, namely the conference room and the UEs. FIG. 6 illustrates an embodiment of a tiled multi-party RTP delivery for 360° conferencing via a conferencing server. When compared to FIG. 4, in FIG. 6, in addition the conferencing server 250 is provided between the conference room 200 and the remote UEs 202$_1$ to 202$_2$. In accordance with embodiments, the conferencing server 250 may be a media resource function, MRF, as defined in 3GPP TS 26.114, or a media control unit, MCU, as defined in 3GPP TS 26.223.

In accordance with the embodiment of FIG. 6, the 360° camera 232 of the conference room 200 may send either the projected 360° video or separate 2D captures, for example from the different fisheye lenses of the camera 232 to the conferencing server 250 as indicated at 252. In case the conferencing server 250 receives the separate 2D captures from the 360° camera 232, the server 250 initially performs a stitching, for example a pixel-domain stitching, to obtain a spherical 360° video and then performs a projection, for example an equirectangular projection, to obtain a projected 360° video. The conferencing server 250 splits the projected 360° video into separate spatial subsets having a sub-360° coverage and encodes the subsets into independent HEVC tiles to be packaged into the RTP streams dependent on the viewport information of the UEs and the operation mode.

In accordance with other embodiments, the HEVC tiling may be performed by the conference room 200 on the projected high resolution 360° video, and the conferencing server 250 receives the high resolution tiles from the conference room 200. In such embodiments the conferencing server 250 may be provided to apply further processing, for example, to create different versions of the received tiles, for example low resolution tiles. Such low resolution tiles may be used for providing, in addition to the viewport tiles, additional tiles surrounding the viewport in a way as described above with reference to FIG. 5 on the basis of the viewing direction information received at the server from the respective UEs. Further, the server 250 which receives the tiles for the entire 360° video, responsive to viewing information from the respective UEs, may decide the tiles to be transmitted via the respective RTP streams to the different UEs.

In accordance with embodiments of the present invention, the server 250 may be operated in a mode in which a server-side tile stitching is performed. In accordance with this embodiment, the conferencing server 250, having received the viewport information from a remote UE at one time instance, selects a subset of the tiles, either generated by the server 250 or received from the conference room 200, that maximizes the viewport quality for the given UE, performs the tile stitching, like a compressed-domain tile stitching, and sends a viewport-optimized stream to the remote UE in a single RTP stream. In accordance with this embodiment, the processing load associated with the stitching of the tiles is shifted to the server 250 which leads to less processing overhead at the receiving UE.

In accordance with yet other embodiments using the conferencing server 250, another operation mode is used employing client-side tile stitching. In such an operation mode, the conferencing server 250 selects a subset of the tiles, either generated at the server 250 or received from the conference room 200 for a remote UE, like UE $202_1$, based on viewport information received from UE $202_1$. The server 250 sends the selected tiles in different RTP streams to the UE $202_1$ which then de-packetizes the individual RTP streams, performs the tile stitching and then decodes and renders a single bitstream for presentation to a user of the UE. In accordance with embodiments, in this operation mode, per tile one RTP stream may be transmitted to a given remote UE. Hence, the number of RTP streams transmitted by the conferencing server 250 is equal to the number of tiles. The different RTP streams may be distinguished by distinct RTP synchronization sources, SSRCs, in the RTP session, and a separate SDP negotiation for each tile/RTP stream may be performed.

In accordance with other embodiments, to reduce the negotiation overhead, multiple tiles may be clustered or grouped and packetized into one RTP stream, e.g., dependent on certain properties, like the quality. For example, the conference room 200 or the conferencing server 250 may send one RTP stream containing high-resolution tiles, for example for the viewport, and another RTP stream containing low-resolution tiles, for example for an area surrounding the viewport (see FIG. 5). Each group may be associated with a certain SSRC.

In accordance with embodiments, the RTP end points that send the multiple streams, for example the conference room 200 or the server 250, do not necessarily need to subdivide their share of the available bandwidth uniformly to each RTP stream. In accordance with embodiments, the end point, like the conference room 200 or the server 250, may vary the allocated bandwidth allocated to different SSRCs, provided the total sending rate does not exceed its allocated share. This enables turning on and off some RTP streams or replacing an RTP stream with another one that requires lower or higher bandwidth, as specified, for example, in RFC 8108.

Embodiments of the present invention concerning the session negotiation for tile 360° multi-party conferencing are now described. In accordance with embodiments, the set of tiles transmitted to the client or remote UE is selected and encoded, for example, by the conference room 200 or the server 250, in such a way that the client may stitch the tiles together to obtain a valid bitstream. This stitchability property of the transmitted tiles, in accordance with embodiments, is signaled in the SDP. For example, the source-level grouping mechanisms of RTP, see for example RFC 5576, source-specific SDP attributes, may be used to indicate that multiple sources, which are related with each other, are used in a media stream. RFC 5576 defines a mechanism to described RTP sources that are identified by their synchronization source, SSRC, identifiers, and that enables expressing a relationship among the different sources. The sources may be grouped together using the SDP media attribute ssrc-group. Each listed source may also be defined using a ssrc:<ssrc-id> <attribute>:<value> line in the same media description.

In accordance with further embodiments, an aggregate level and/or alternative resolutions/qualities may be signaled. The following illustrates an example of an SDP description in which high quality, HQ, and low quality, LQ, tiles are placed in two different ssrc-groups, and for each group, the payload format in codec-specific attributes, for example level, SEI messages, may be specified in respective ssrc lines.

Syntax:
    a=ssrc-group:<semantics><ssrc-id> . . .
    a=ssrc:<ssrc> fmtp:<format><format specific parameters>

Example:
    a=ssrc:1034 fmtp:98;tx-mode=MRST;sprop-sei= . . .
    a=ssrc:3241 fmtp:98;tx-mode=MRST;sprop-sei= . . .
    a=ssrc-group:HQ_tiles 1034 3241 aggregate-level=153
    a=ssrc:9812 fmtp:98;tx-mode=MRST;sprop-sei= . . .
    a=ssrc:1759
    fmtp:98;tx-mode=MRST;sprop-sei= . . . a=ssrc-group: LQ_tiles 9812
    1759 aggregate-level=93

An aggregate level may be defined for different combination of tile groups, for example as specified using ssrc-groups. This may be an attribute of an ssrc-group indicating the aggregate level attained by combining all of the tiles in the particular group.

Further, in the SDP it may be signaled which alternative resolution/quality levels may be made available, for example by the conference room or the conferencing server, in order to address the different UEs with different decoder capabilities or for the case of a rate adaptation adaption. For example, the capability for creating different high-res/low-res combinations, like 12 HR/12 LR or 16 HR/8 LR, may be signaled.

Corresponding aggregate levels for such combinations may be indicated in the SDP description and negotiated during the SDP offer/answer process.

Embodiments concerning the signaling using an RTP header or payload header extensions, like a PACI packet, are now described. RFC 3550 allows RTP header extensions enabling the inserting of additional, for example payload-format-independent, information into the RTP packet header. Also, payload-specific header extensions are possible. In case of HEVC, the RTP payload header may be extended if a certain type of packet, called PACI, is used. PACI packets have a payload header extension structure, PHES, field, where additional control information may be signaled.

In accordance with embodiments of the present invention, the switching point for a spherical location or a switching point for a tiling configuration may be signaled using such header extensions. For example, when a viewing direction changes, i.e., a tile composition changes due to other tiles or another number of tiles need to be transmitted in view of the changed viewport, the client-side renderer is to adapt to the new tile composition. This requires the client-side renderer to re-initialize its texture locations so that any change in the decoded video frame is correctly reflected in the rendered viewport. The viewport stream, however, only carries information about those changes at the very bitstream position/picture where the change actually occurs, i.e., there is no notifying ahead of the change, for example at a higher layer such as a transport layer, RTP, or at a certain time in advance of a change, like a location 10 pictures ahead of the change. To address this issue, in accordance with embodiments, the header, like the PACI header, may carry information about the spherical location of the user viewport inside the 360° video or about the tiling configuration. This information may be used by the receiver during rendering, for example for adjusting the rendering process. The spherical location information may be signaled using a spherical coordinate system, similar to the region-wise packing in OMAF.

In accordance with another embodiment, the sender, like the conference room or the server, may signal that a current spherical location or a current tiling configuration, for example the quality or resolution or number of tiles, may be modified at a future time, for example expressed in a distance in time, pictures or packets. This signaling may be performed using the PACI header or another RTP header extension mechanism. This approach is beneficial in many cases, for example for the timely allocation of resources for adjustment of the rendering process at the client-side renderer.

Because the costs for re-initializing the renderer may be relatively high, in accordance with embodiments, the number of changes of a spherical location or changes of a tiling configuration may be limited over time to avoid changes being too frequent, meaning, for example, a switch from one tile selection to another, like from a 6×4 tiling to an 8×6 tiling. Therefore, in accordance with such embodiments, a minimum distance between changes may be defined, for example a minimum distance in time, pictures or packets between RWP or tiling changes. The minimum distance may be defined, negotiated and/or signaled.

In accordance with further embodiments, the slice header may be signaled. In accordance with such embodiments, the PACI header or another RTP header extension mechanism may be employed for indicating the length of the slice header. Indicating the length of the slice header in the header extension is beneficial, for example in a situation in which the content is generated in such a way that the payload of several slices may be concatenated while keeping only the slice header of the first slice. In such a scenario, the slices need to be ordered in a specific way, i.e., with RTP streams that have the same slice placed within the same tile row. This approach is also beneficial in cases in which the content is generated in such a way that all other slices but the first one may be changed to dependent slice segments. Additional information may be provided that allows for computing quickly the new and shorter slice headers, for example the cu_addresses or slice_type values.

With the length of the original slice header indicated and the additional information that allows a quick manipulation and concatenation of the content, the merged bitstream may be generated more easily at the client-side.

In accordance with embodiments, the receiver may signal in the SDP that the above-mentioned operation is required.

In the following, embodiments of the inventive approach dealing with the bitrate adaptation for the tile delivery of content to multiple remote UEs are described. In RTP, a video sender may adapt the video output rate based on the RTCP receiver reports. In case tiles are transmitted to a remote UE via multiple RTP streams, the sender, like the conference room or the conferencing server, may adapt the bitrates assigned to the different RTP streams in an RTP session in order to prioritize the quality of the tiles inside the viewport. The total sum of the bitrates assigned to all tiles is constrained by the bandwidths allocated to the RTP session by the RTP congestion control algorithm. In case of a single RTP stream, obtained, as explained above, by compressed-domain stitching of the tiles on the server-side, in a similar way, the quality and total bitrate constraints need to be considered.

In accordance with an embodiment concerning the bitrate adaptation, the process starts with a uniform bitrate which is adapted according to the viewport. For example, an RTP session may be established between the conference room 200 or the conferencing server 250 and a remote UE, like UE $202_1$. During the SDP negotiation, the remote UE $202_1$ may indicate its viewport-dependent processing capabilities. When this session starts, the conference room or conferencing server encodes all tiles with the same uniform bitrate or with a uniform resolution and starts transmitting the tiles to the remote UE. Based on the RTCP feedback messages received from the remote UE, the conference room may prioritize the bitrate of the tiles corresponding to the viewport of the remote UE, i.e., the tiles within the viewport may be encoded with a high resolution or quality when compared to tiles outside the viewport.

In accordance with other embodiments concerning the bitrate adaptation, a minimum quality inside the viewport may be considered. For example, during the session negotiation the remote UE may indicate that it has a certain minimum quality/minimum requirement for tiles inside its viewport, regardless of the actual network condition. For example, a remote UE may indicate a minimum acceptable tile resolution. The conference room may arrange the set of transmitted tiles such that the minimum quality requirement of the remote UE is fulfilled. Due to the limited bandwidth allocated to the RTP session as well as the limited decoder capabilities of the remote UE, the conference room may reduce the resolution/quality of the non-viewport tiles or may send a limited set of tiles that lead to a constrained coverage, less than the 360° view, when stitched by the remote view.

In accordance with yet another embodiment for a bitrate adaptation, in response to a change of the available network bandwidth, the sender may reduce or increase the bitrate for all transmitted tiles equally until the sum of bitrates satisfies the bandwidth budget. In other words, the actual user viewport does not play a role in the bitrate adaptation.

In accordance with another embodiment concerning the bitrate adaptation, a viewport-dependent adaptation may be employed. Other than in the previous embodiment, the actual user viewport plays a role in the bitrate adaptation and the sender considers the actual user viewport when performing such a bitrate adaptation. For example, in case the available network bandwidth decreases, the sender may perform one of the following actions:

The sender may try to keep the viewport-tiles at a consistent quality while reducing the bitrates of the non-viewport tiles.

The sender may reflect the decrease in an equal manner to viewport tiles and non-viewport tiles such that there is a uniform decrease in bitrates of all transmitted tiles. This may result in a decrease of the user QoE, quality of experience, because also the viewport-tiles are also affected by the bandwidth reduction.

The sender may choose to keep non-viewport-tiles at the same quality as before, for example as a precautionary measure in high-latency conditions—see FIG. 5, and decrease the bitrates of the viewport-tiles more significantly. This may result in a greater decrease of user QoE in some cases but may be advantageous in case a fallback layer needs to be displayed often in case of high network latencies.

In case the available network bandwidth increases, the sender may perform one of the following actions:

The sender may assign the additional throughput budget to the viewport-tiles and keep the non-viewport tiles in the same quality.

The sender may increase the bitrates of all tiles in an equal manner.

The sender may keep the viewport-tiles in the same bitrate and distribute the additional throughput budget to the non-viewport tiles which may be useful in the above-described high-latency environment (see FIG. 5) in which the receiver may often have to resort to the fallback layer.

The above-described embodiments concerning the bitrate adaptation decisions at the sender may depend on the amount of decrease/increase in the available bandwidths and the network latency. Also, the decisions may be effected by a minimum acceptable bitrate or quality or resolution requirement as signaled by the receiver during the session negotiation.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 7:
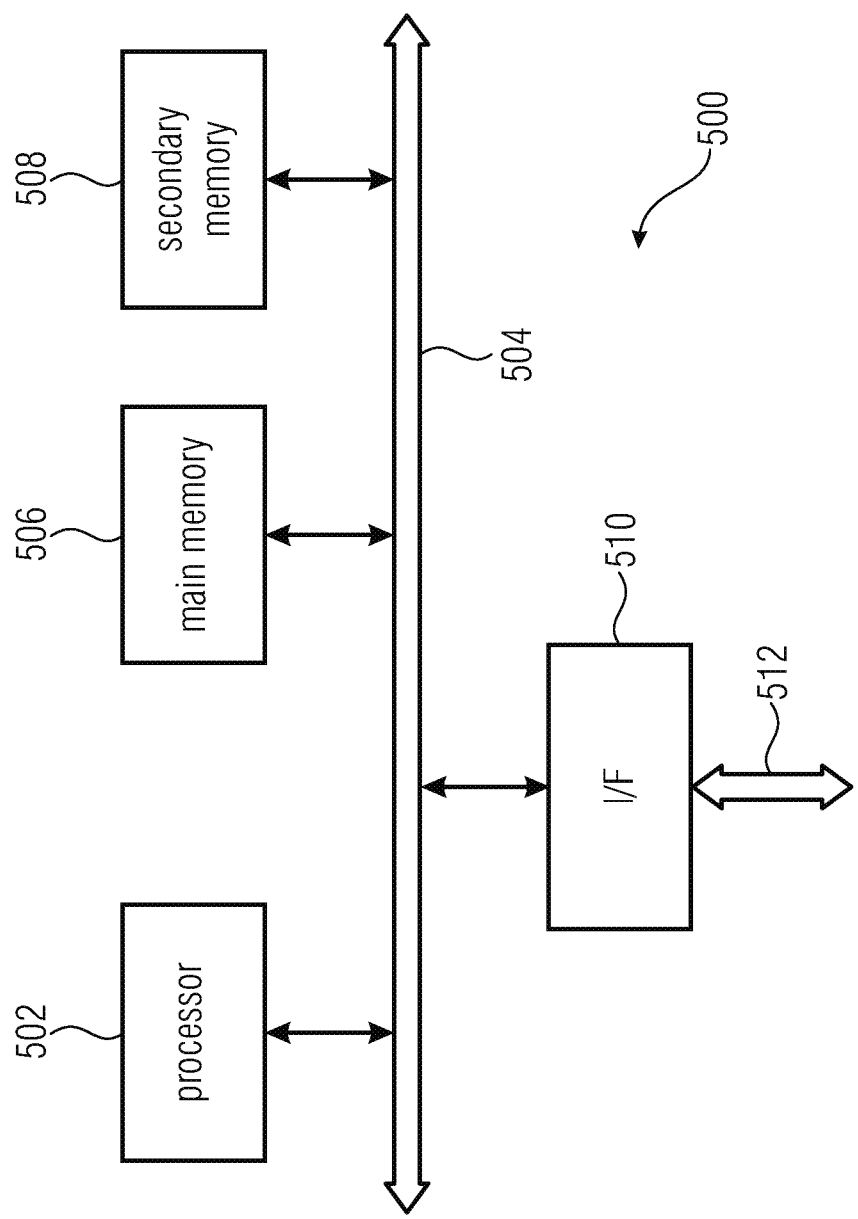
FIG. 7 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

RFC 3550 RTP: A Transport Protocol for Real-Time Applications
RFC 7798 RTP Payload Format for High Efficiency Video Coding (HEVC)
RFC 8285 A General Mechanism for RTP Header Extensions
RFC 4585 Extended RTP Profile for Real-time Transport Control Protocol (RTCP)-Based Feedback (RTP/AVPF)
RFC 3611 RTCP extended reports (XRs)
RFC 5968 Guidelines for Extending the RTP Control Protocol (RTCP)
RFC 8108 Sending Multiple RTP Streams in a Single RTP Session
RFC 7667 RTP Topologies
3GPP TS 26.114 IP Multimedia Subsystem (IMS); Multimedia telephony; Media handling and interaction
3GPP TS 26.223 Telepresence using the IP Multimedia Subsystem (IMS); Media handling and interaction
OMAF ISO/IEC 23090-2:2019 Information technology—Coded representation of immersive media—Part 2: Omnidirectional media format

The invention claimed is:

1. An apparatus for providing 360° media content to a plurality of receivers, wherein the apparatus is to
    acquire for a representation of the 360° media content a first plurality of tiles, the first plurality of tiles covering a part of or the whole representation of the 360° media content,
    for some or all of the plurality receivers, transmit to each receiver the first plurality of tiles and a second plurality of tiles,
    wherein the second plurality of tiles cover for a respective receiver only a viewport in the representation of the 360° media content,
    wherein the second plurality of tiles overlaps the first plurality of tiles, and
    wherein, responsive to viewport information from a receiver, the apparatus is to encode the second plurality of tiles corresponding to the viewport in the representation of the 360° media content in a quality or resolution being higher than a quality or resolution for the first plurality of tiles.

2. The apparatus of claim 1, comprising
    a source of the 360° media content, the source providing the representation of the 360° media content,
    wherein, to acquire the first plurality of tiles, the apparatus is to encode the representation from the source into the first plurality of tiles, and
    wherein the apparatus is to establish a session with the receivers, and to transmit to each receiver one or more of the first plurality of tiles using one or more video streams.

3. The apparatus of claim 1, wherein
    the apparatus is connectable to an external source of the 360° media content, the source providing the representation of the 360° media content,
    the apparatus is to receive the representation of the 360° media content from the external source,
    to acquire the first plurality of tiles, the apparatus is to encode the representation from the source into the first plurality of tiles, and
    the apparatus is to establish a session with the receivers, and to transmit to each receiver one or more of the first plurality of tiles using one or more video streams.

4. The apparatus of claim 1, wherein
    the apparatus is connectable to an external source of the 360° media content, the source providing the representation of the 360° media content in a tiled form,
    to acquire the first plurality of tiles, the apparatus is to receive the tiled representation of the 360° media content from the external source,
    the apparatus is to establish a session with the receivers, and to transmit to each receiver one or more of the first plurality of tiles using one or more video streams.

5. The apparatus of claim 1, wherein the apparatus is to
    receive the viewport information from each of the receivers, and
    transmit, responsive to the viewport information, to each of the receivers a plurality of video or RTP streams, each video stream comprising one or more of the second plurality of tiles only covering the viewport of the respective receiver.

6. The apparatus of claim 5, wherein
    to acquire the first plurality of tiles, the apparatus is to encode the representation into the first plurality of tiles, and packetize each tile into one video stream, and
    the apparatus is to transmit to each of the receivers a different set of tiles of the second plurality of tiles covering the viewport of the receiver.

7. The apparatus of claim 1, wherein the apparatus is to cluster and packetize the first plurality of tiles into one RTP stream.

8. The apparatus of claim 1, wherein, dependent on a latency, at a link between the apparatus and a receiver, the apparatus is to
    transmit only the second plurality of tiles, or
    transmit the second plurality of tiles and a third plurality of tiles outside the receiver's viewport, the number increasing with an increase in latency at the link,
    wherein the third plurality of tiles has the same resolution or quality as the second plurality of tiles or has a resolution or quality lower than the second plurality of tiles.

9. The apparatus of claim 8, wherein the apparatus is to transmit only the second plurality of tiles, in case the latency is at or below a first threshold, transmit the second and third plurality of tiles for a larger area than the receiver's viewport, but not the whole representation, in case the latency is above the first threshold and at or below a second threshold, or transmit the second and third plurality of tiles for the whole representation, in case the latency is above the second threshold.

10. The apparatus of claim 1, wherein the apparatus is to perform bitrate adaptation, so that the first and second plurality of tiles are transmitted to the receivers with different bitrates.

11. The apparatus of claim 10, wherein the apparatus is to perform a bitrate adaptation based on RTCP receiver reports.

12. The apparatus of claim 10, wherein the apparatus is to consider an actual user viewport when performing bitrate adaptation.

13. The apparatus of claim 12, wherein, in case the available network bandwidth decreases, the apparatus is to perform one of the following:

keep the second plurality of tiles at a consistent quality while reducing the bitrates of the first plurality of tiles, or reflect the decrease in an equal manner to the second plurality of tiles and to the first plurality of tiles such that there is a uniform decrease in bitrates of all transmitted tiles, or keep the first plurality of tiles at the same quality as before and decrease the bitrates of the second plurality of tiles more significantly.

14. The apparatus of claim 1, wherein the immersive 360° media content to be provided or presented comprises a projected video transmission.

15. The apparatus of claim 1, wherein the 360° media content is to be identified by a certain Supplementary Enhancement Information, SEI, parameter, or an indication of a particular video codec or profile, or an additional attribute in the Session Description Protocol, SDP.

* * * * *